United States Patent
Holopainen et al.

(10) Patent No.: US 12,122,046 B2
(45) Date of Patent: Oct. 22, 2024

(54) WASTE SORTING ROBOT

(71) Applicant: ZENROBOTICS OY, Helsinki (FI)

(72) Inventors: Harri Holopainen, Espoo (FI); Tuomas Lukka, Helsinki (FI)

(73) Assignee: MP ZENROBOTICS OY, Vantaa (FI)

( * ) Notice: Subject to any disclaimer, the term of this patent is extended or adjusted under 35 U.S.C. 154(b) by 0 days.

(21) Appl. No.: 18/003,254

(22) PCT Filed: Jun. 16, 2021

(86) PCT No.: PCT/FI2021/050453
§ 371 (c)(1),
(2) Date: Dec. 23, 2022

(87) PCT Pub. No.: WO2021/260264
PCT Pub. Date: Dec. 30, 2021

(65) Prior Publication Data
US 2023/0241787 A1    Aug. 3, 2023

(30) Foreign Application Priority Data

Jun. 24, 2020  (SE) .................................. 2030211-3

(51) Int. Cl.
*B25J 9/00*   (2006.01)
*B08B 3/04*   (2006.01)
(Continued)

(52) U.S. Cl.
CPC ............. *B25J 19/0058* (2013.01); *B08B 3/08* (2013.01); *B08B 13/00* (2013.01);
(Continued)

(58) Field of Classification Search
CPC .... B25J 19/0058; B25J 15/0616; B25J 15/00; B25J 19/00; B08B 3/08; B08B 13/00;
(Continued)

(56) References Cited

U.S. PATENT DOCUMENTS

| | | |
|---|---|---|
| 3,896,940 A | 7/1975 | Birrell |
| 4,305,130 A | 12/1981 | Kelley et al. |

(Continued)

FOREIGN PATENT DOCUMENTS

| | | |
|---|---|---|
| CN | 1291537 | 4/2001 |
| CN | 1651295 | 8/2005 |

(Continued)

OTHER PUBLICATIONS

Machine translation of CN-108013841-A (Year: 2018).*
(Continued)

*Primary Examiner* — Erin F Bergner
(74) *Attorney, Agent, or Firm* — Knobbe, Martens, Olson & Bear, LLP (57) ABSTRACT

A waste sorting robot comprises a manipulator moveable within a working area. A suction gripper is connected to the manipulator and arranged to selectively grip a waste object in the working area. An air supply is in fluid communication with the suction gripper and configured to generate an airflow along an airflow path in the suction gripper. A solvent outlet in fluid communication with a solvent supply wherein the solvent outlet configured to dose the airflow with the solvent.

20 Claims, 9 Drawing Sheets

(51) Int. Cl.
    *B08B 3/08*    (2006.01)
    *B08B 13/00*   (2006.01)
    *B25J 19/00*   (2006.01)
    *B25J 15/06*   (2006.01)
(52) U.S. Cl.
    CPC ............... *B07C 2501/0054* (2013.01); *B07C 2501/0063* (2013.01); *B25J 15/0616* (2013.01)
(58) Field of Classification Search
    CPC ............. B08B 3/04; B07C 2501/0054; B07C 2501/0063; B65G 47/91
    See application file for complete search history.

(56) References Cited

U.S. PATENT DOCUMENTS

| | | | |
|---|---|---|---|
| 4,616,121 A | 10/1986 | Clocksin |
| 4,679,291 A | 7/1987 | Schmeal et al. |
| 4,763,941 A | 8/1988 | Sniderman |
| 4,835,730 A | 5/1989 | Shimano et al. |
| 4,998,442 A | 3/1991 | Brown et al. |
| 5,100,005 A | 3/1992 | Noble et al. |
| 5,116,190 A | 5/1992 | Silke |
| 5,188,411 A | 2/1993 | Golden |
| 5,244,242 A | 9/1993 | Goedecke et al. |
| 5,299,693 A | 4/1994 | Ubaldi et al. |
| 5,322,272 A | 6/1994 | Benz et al. |
| 5,423,431 A | 6/1995 | Westin |
| 5,445,247 A | 8/1995 | Sato |
| 5,572,785 A | 11/1996 | Tveit |
| 5,617,338 A | 4/1997 | Sugano |
| 5,617,898 A | 4/1997 | Nagai |
| 5,626,378 A | 5/1997 | Puhl et al. |
| 5,636,966 A | 6/1997 | Lyon et al. |
| 5,733,098 A | 3/1998 | Lyon et al. |
| 5,735,782 A | 4/1998 | Berg |
| 5,934,864 A | 8/1999 | Lyon et al. |
| 5,987,726 A | 11/1999 | Akeel |
| 5,992,691 A | 11/1999 | Post et al. |
| 6,008,636 A | 12/1999 | Miller et al. |
| 6,024,392 A | 2/2000 | Blatt |
| 6,056,108 A | 5/2000 | Buchi et al. |
| 6,168,220 B1 | 1/2001 | Schmalz et al. |
| 6,213,709 B1 | 4/2001 | Hebrank |
| 6,256,553 B1 | 7/2001 | Erikkila |
| 6,304,050 B1 | 10/2001 | Skaar et al. |
| 6,331,758 B1 | 12/2001 | Takanashi et al. |
| 6,817,639 B2 | 11/2004 | Schmalz et al. |
| 6,967,465 B2 | 11/2005 | Takenaka et al. |
| 7,327,112 B1 | 2/2008 | Hlynka et al. |
| 7,415,321 B2 | 8/2008 | Okakaki et al. |
| 7,650,203 B2 | 1/2010 | Maslov et al. |
| 7,957,580 B2 | 6/2011 | Ban et al. |
| 7,966,094 B2 | 6/2011 | Ban et al. |
| 7,996,114 B2 | 8/2011 | Ban et al. |
| 8,098,928 B2 | 1/2012 | Ban et al. |
| 8,351,681 B2 | 1/2013 | Koike |
| 8,380,342 B2 | 2/2013 | Ban et al. |
| 8,606,398 B2 | 12/2013 | Eakins et al. |
| 8,777,284 B2 | 7/2014 | Schaller et al. |
| 8,880,217 B2 | 11/2014 | Izumi et al. |
| 9,082,454 B2 | 7/2015 | Yao et al. |
| 9,205,558 B1 | 12/2015 | Zevenbergen et al. |
| 9,272,417 B2 | 3/2016 | Konolige et al. |
| 9,230,329 B2 | 5/2016 | Lukka |
| 9,486,926 B2 | 11/2016 | Kawano |
| 9,600,798 B2 | 3/2017 | Battles et al. |
| 9,713,875 B2 | 7/2017 | Lukka |
| 9,789,517 B2 | 10/2017 | Doublet et al. |
| 9,914,213 B1 | 3/2018 | Vijayanarasimhan et al. |
| 10,449,572 B2 | 10/2019 | Ripley |
| 10,464,105 B2 | 11/2019 | Koistinen et al. |
| 10,482,120 B2 | 11/2019 | Ripley |
| 10,576,630 B1 | 3/2020 | Diankov et al. |
| 10,639,790 B1 | 5/2020 | Bacon et al. |
| 11,607,807 B2 | 3/2023 | Zadeh et al. |
| 11,660,762 B2 | 5/2023 | Holopainen et al. |
| 11,851,292 B2 | 12/2023 | Lukka et al. |
| 2002/0190230 A1 | 12/2002 | Dworkowski |
| 2002/0193909 A1 | 12/2002 | Parker et al. |
| 2003/0012925 A1 | 1/2003 | Gorrell |
| 2003/0133775 A1 | 7/2003 | Specher |
| 2004/0094979 A1 | 5/2004 | Damhuis |
| 2005/0077856 A1 | 4/2005 | Takenaka et al. |
| 2005/0173164 A1 | 8/2005 | Maslov et al. |
| 2005/0218677 A1 | 10/2005 | Llich |
| 2005/0279612 A1 | 12/2005 | Boberg |
| 2006/0053624 A1 | 3/2006 | Maeda et al. |
| 2007/0131213 A1 | 6/2007 | Matsuda |
| 2007/0147678 A1 | 6/2007 | Gotting |
| 2007/0187299 A1 | 8/2007 | Valerio |
| 2007/0213874 A1 | 9/2007 | Oumi et al. |
| 2007/0276539 A1 | 11/2007 | Habibi et al. |
| 2007/0299559 A1 | 12/2007 | Jassen |
| 2008/0150965 A1 | 6/2008 | Bischoff et al. |
| 2008/0240511 A1 | 10/2008 | Ban et al. |
| 2009/0025502 A1 | 1/2009 | Nakamoto |
| 2010/0004778 A1 | 1/2010 | Arimatsu et al. |
| 2011/0076128 A1 | 3/2011 | Johnson |
| 2011/0231018 A1 | 9/2011 | Iwai et al. |
| 2012/0032461 A1 | 2/2012 | Hukelmann |
| 2013/0127192 A1 | 5/2013 | Regan et al. |
| 2013/0127194 A1 | 5/2013 | Regan et al. |
| 2014/0025197 A1 | 1/2014 | Mattern |
| 2014/0036276 A1 | 2/2014 | Gross et al. |
| 2014/0062112 A1 | 3/2014 | Ho-Young |
| 2015/0016933 A1 | 1/2015 | Ochiishi |
| 2015/0241203 A1 | 8/2015 | Jordil |
| 2015/0328779 A1 | 11/2015 | Bowman et al. |
| 2016/0332310 A1 | 11/2016 | Conall |
| 2017/0028562 A1 | 2/2017 | Yamazaki et al. |
| 2017/0073174 A1 | 3/2017 | Tanaka |
| 2017/0174439 A1 | 6/2017 | Ripley |
| 2017/0291308 A1 | 10/2017 | Junichi |
| 2017/0355083 A1 | 12/2017 | Wigren |
| 2018/0036774 A1 | 2/2018 | Lukka et al. |
| 2018/0050451 A1 | 2/2018 | Takanishi et al. |
| 2018/0127219 A1 | 5/2018 | Wagner et al. |
| 2019/0030571 A1 | 1/2019 | Horowitz et al. |
| 2019/0039838 A1* | 2/2019 | Curhan ............... B25J 15/0616 |
| 2019/0084012 A1 | 3/2019 | McCoy et al. |
| 2019/0126478 A1 | 5/2019 | Scott et al. |
| 2019/0130560 A1 | 5/2019 | Horowitz et al. |
| 2019/0217342 A1 | 7/2019 | Parr et al. |
| 2019/0291283 A1 | 9/2019 | Kurz |
| 2019/0361672 A1 | 11/2019 | Odhner et al. |
| 2019/0389082 A1 | 12/2019 | Higo |
| 2020/0048015 A1 | 2/2020 | Martin et al. |
| 2020/0077074 A1 | 3/2020 | Denenberg et al. |
| 2020/0087118 A1 | 3/2020 | Sato et al. |
| 2020/0130935 A1 | 4/2020 | Wagner et al. |
| 2020/0269429 A1 | 8/2020 | Chavez et al. |
| 2020/0290214 A1 | 9/2020 | Watanabe et al. |
| 2021/0061588 A1 | 3/2021 | Lukka et al. |
| 2021/0114062 A1 | 4/2021 | Liu et al. |
| 2021/0206586 A1 | 7/2021 | Douglas et al. |
| 2021/0237260 A1 | 8/2021 | Holopainen et al. |
| 2021/0237262 A1 | 8/2021 | Holopainen et al. |
| 2023/0144252 A1 | 5/2023 | Lukka et al. |
| 2023/0191608 A1 | 6/2023 | Horowitz et al. |
| 2023/0405639 A1 | 12/2023 | Holopainen et al. |
| 2024/0042624 A1 | 2/2024 | Holopainen |

FOREIGN PATENT DOCUMENTS

| | | |
|---|---|---|
| CN | 101088720 | 12/2007 |
| CN | 101471546 | 7/2009 |
| CN | 101618444 | 1/2010 |
| CN | 101508181 | 4/2011 |
| CN | 102431787 | 5/2012 |
| CN | 203212009 | 9/2013 |
| CN | 103787059 | 5/2014 |
| CN | 204057223 | 12/2014 |
| CN | 104513012 | 4/2015 |

(56) References Cited

FOREIGN PATENT DOCUMENTS

| | | | |
|---|---|---|---|
| CN | 104589351 | 5/2015 | |
| CN | 105196302 | 12/2015 | |
| CN | 105215076 | 1/2016 | |
| CN | 105372510 | 3/2016 | |
| CN | 107363405 | 11/2017 | |
| CN | 107650139 | 2/2018 | |
| CN | 107738264 | 2/2018 | |
| CN | 106362957 | 5/2018 | |
| CN | 108013841 A * | 5/2018 | ......... A47L 15/0086 |
| CN | 108032324 | 5/2018 | |
| CN | 108971190 | 12/2018 | |
| CN | 109013384 | 12/2018 | |
| CN | 109176522 | 1/2019 | |
| CN | 109249402 | 1/2019 | |
| CN | 109433633 | 3/2019 | |
| CN | 110116415 | 8/2019 | |
| CN | 209866708 | 12/2019 | |
| DE | 2455284 | 5/1976 | |
| DE | 4127446 | 5/1995 | |
| DE | 4440748 A1 | 5/1996 | |
| DE | 10319253 A1 | 12/2004 | |
| DE | 102010029662 | 12/2011 | |
| DE | 102015009998 | 2/2016 | |
| DE | 102015220413 | 4/2017 | |
| DK | 3056289 | 1/2019 | |
| EP | 0253229 | 1/1988 | |
| EP | 0706838 | 4/1996 | |
| EP | 1466704 | 10/2004 | |
| EP | 1810795 | 7/2007 | |
| EP | 1918479 | 5/2008 | |
| EP | 2476813 | 7/2012 | |
| EP | 2585256 | 5/2013 | |
| EP | 2694224 | 2/2014 | |
| EP | 2758216 | 7/2014 | |
| EP | 2810901 | 12/2014 | |
| EP | 3056288 | 8/2016 | |
| EP | 3056289 | 8/2016 | |
| EP | 3236083 | 10/2017 | |
| EP | 3254998 | 12/2017 | |
| EP | 3496873 | 6/2019 | |
| EP | 3626412 | 3/2020 | |
| EP | 3658302 | 6/2020 | |
| EP | 3672764 | 7/2020 | |
| EP | 3674040 | 7/2020 | |
| EP | 3677388 | 7/2020 | |
| GB | 2325915 | 12/1998 | |
| GB | 2354752 A | 4/2001 | |
| IT | MI20 081 360 | 1/2010 | |
| JP | S5045304 | 4/1975 | |
| JP | 61-249292 | 11/1986 | |
| JP | H01 240287 | 9/1989 | |
| JP | H03154793 | 7/1991 | |
| JP | H4176583 | 6/1992 | |
| JP | H0489687 | 8/1992 | |
| JP | H05228780 | 9/1993 | |
| JP | H05318369 | 12/1993 | |
| JP | H0630857 | 4/1994 | |
| JP | H0740273 | 2/1995 | |
| JP | 05089337 | 12/1996 | |
| JP | H092682 | 1/1997 | |
| JP | 9131575 | 5/1997 | |
| JP | H1069315 | 3/1998 | |
| JP | 10-202571 | 8/1998 | |
| JP | H11198076 | 7/1999 | |
| JP | H11320461 | 11/1999 | |
| JP | 2001138280 | 5/2001 | |
| JP | 2002301683 | 10/2002 | |
| JP | 2003031636 | 1/2003 | |
| JP | 2003223642 | 8/2003 | |
| JP | 2005117791 | 4/2005 | |
| JP | 3684278 | 8/2005 | |
| JP | 2007040273 | 2/2007 | |
| JP | 2010089238 | 4/2010 | |
| JP | 4947691 | 6/2012 | |
| JP | 2012115916 | 6/2012 | |
| JP | 2013252568 | 12/2013 | |
| JP | 2014516810 | 4/2014 | |
| JP | 5688924 | 3/2015 | |
| JP | 2016068034 | 5/2016 | |
| JP | 2016225336 | 12/2016 | |
| JP | 2020022929 | 2/2020 | |
| JP | 2020022930 | 2/2020 | |
| JP | 2020062633 | 4/2020 | |
| KR | 20190050145 | 5/2019 | |
| KR | 20190071387 | 6/2019 | |
| SU | 1 399 116 | 5/1988 | |
| WO | WO 89/08537 | 9/1989 | |
| WO | WO 89/012019 | 12/1989 | |
| WO | WO 9524544 A1 | 9/1995 | |
| WO | WO 98/019799 | 5/1998 | |
| WO | WO 2008/102052 | 8/2008 | |
| WO | WO 2011/161304 | 12/2011 | |
| WO | WO 2012/052615 | 4/2012 | |
| WO | WO 2012/089928 | 7/2012 | |
| WO | WO 2012/156579 | 11/2012 | |
| WO | WO 2013/068115 | 5/2013 | |
| WO | WO 2014/202998 | 12/2014 | |
| WO | WO 2016/070412 | 5/2016 | |
| WO | WO 2019/056102 | 3/2019 | |
| WO | WO 2019/207202 | 10/2019 | |
| WO | WO 2019207201 | 10/2019 | |
| WO | WO 2019/215384 | 11/2019 | |
| WO | WO 2020/053195 | 3/2020 | |
| WO | WO2020/079125 | 4/2020 | |
| WO | WO 2020/082176 | 4/2020 | |

OTHER PUBLICATIONS

Machine translation of CN 108032324 (Year: 2018).*
U.S. Appl. No. 17/049,564, Waste Sorting Gantry Robot, filed Oct. 21, 2020.
U.S. Appl. No. 17/049,922, Waste Sorting Gantry Robot, filed Oct. 21, 2020.
U.S. Appl. No. 17/049,565, Waste Sorting Gantry Robot Comprising an Integrated Maintenance Hatch, filed Oct. 21, 2020.
U.S. Appl. No. 17/051,422, Waste Sorting Robot, filed Oct. 28, 2020.
U.S. Appl. No. 17/798,775, Waste Sorting Robot, filed Aug. 10, 2022.
U.S. Appl. No. 17/086,671, Method and an Apparatus for Separating at Least One Object from a Plurality of Objects, filed Nov. 2, 2020.
Swedish Search Report for Patent Application No. 2030211-3 dated Feb. 4, 2021 in 7 pages.
International Search Report and Written Opinion in PCT/FI2021/050453 mailed Feb. 9, 2021 in 9 pages.
Boudaba et al., "Grasping of Planar Objects using Visual Perception", Article, p. 605-611.
Chinese Office Action, dated Apr. 3, 2015,in corresponding Chinese Patent Application No. 201280056743.X.
Cort, "Robotic parts feeding," Assembly, Jun. 2007, https://www.assemblymag.com/articles/86446-robotic-parts-feeding.
Extended European Search Report issued in PCT/FI2019/050322 dated Mar. 29, 2022.
Extended European Search Report issued in PCT/FI2019/050322 dated Aug. 31, 2022.
Extended European Search Report issued in PCT/FI2019/050320 dated Jan. 24, 2022.
Finnish Search Report dated Jun. 19, 2012, corresponding to the Foreign Priority Application No. 20115923.
Fujimoto et al., Image-Based Visual Serving for Grasping Unknown Objects, Article, p. 876-881.
International Preliminary Report on Patentability issued in PCT/FI2021/050720 dated May 2, 2023.
International Preliminary Report on Patentability issued in PCT/FI2021/050722 dated May 2, 2023.
International Search Report issued in PCT/FI2012/050909 dated Mar. 4, 2013.
International Search Report and Written Opinion of PCT/FI2019/050319, dated Jul. 29, 2019, in 17.

(56) References Cited

OTHER PUBLICATIONS

International Search Report and Written Opinion issued in PCT/FI2019/050320 dated Jul. 30, 2019.
International Search Report and Written Opinion of PCT/FI2019/050321, dated Jul. 30, 2019, in 13 pages.
International Search Report and Written Opinion issued in PCT/FI2019/050322 dated Aug. 28, 2019.
International Search Report and Written Opinion issued in PCT/IF2021/050088 dated May 4, 2021.
International Search Report issued in PCT/FI2021/050720 dated Nov. 16, 2021.
International Search Report issued in PCT/FI2021/050722 dated Jan. 19, 2022.
Jang et al., "Visibility-based spatial reasoning for object manipulation in cluttered environments", Apr. 2008, pp. 42-438, vol. 40, Issue 4.
Japanese Office Action dated Aug. 25, 2015; Application No. 2013-546749.
Japanese Office Action dated Jul. 25, 2016; Application No. 2014-531283.
Kristensen et al., "Bin-picking with a solid state range camera", Jun. 30, 2001, pp. 143-151, vol. 35, Issues 3-4.
Morales et al., "Vision-based three-finger grasp synthesis constrained by hand geometry," Article, Jun. 30, 2006, p. 496-512, vol. 54, Issue 6.
Office Action received in Swedish Application No. 2030325-1 dated Jun. 28, 2021.
Office Action received in Swedish Application No. 2030327-7 dated Jun. 29, 2021.
Wong et al., "Vision Strategies for Robotic Manipulation of Natural Objects," Article, Dec. 2-4, 2009, p. 8, New Zealand.
Yanagihara et al., "Parts-picking in Disordered Environment," Article, Nov. 3-5, 1991, p. 517-522, Japan.

\* cited by examiner

WASTE SORTING ROBOT

The present invention relates to a waste sorting robot for sorting waste objects.

In the waste management industry, industrial and domestic waste is increasingly being sorted in order to recover and recycle useful components. Each type of waste, or "fraction" of waste can have a different use and value. If waste is not sorted, then it often ends up in landfill or incineration which has an undesirable environmental and economic impact.

It is known to sort industrial and domestic waste using a waste sorting robot. The waste sorting robot may pick objects with a suction gripper which uses negative pressure for sucking and gripping an object to be sorted. A problem with existing suction grippers is that the waste sorting environment has a significant amount of dust and debris. This means that the suction gripper can become blocked and that the waste sorting robot must be taken offline whilst maintenance is carried out.

Examples described hereinafter aim to address the aforementioned problems.

In a first aspect of the disclosure, there is provided a waste sorting robot comprising: a manipulator moveable within a working area; a suction gripper connected to the manipulator and arranged to selectively grip a waste object in the working area; an air supply in fluid communication with the suction gripper configured to generate an airflow along an airflow path in the suction gripper; and a solvent outlet in fluid communication with a solvent supply wherein the solvent outlet configured to dose the airflow with the solvent.

In another aspect of the disclosure there is provided a waste sorting robot comprising: a manipulator moveable within a working area; a suction gripper connected to the manipulator and arranged to generate a negative pressure to selectively grip a waste object in the working area; an air supply in fluid communication with the suction gripper configured to generate a positive pressure airflow along an airflow path in the suction gripper; and a solvent outlet in fluid communication with a solvent supply wherein the solvent outlet configured to dose the positive pressure airflow with the solvent.

Optionally, the solvent outlet is mounted on the suction gripper along the airflow path. Optionally, the solvent outlet is mounted on the suction gripper along the positive pressure airflow path.

Optionally, solvent outlet is in fluid connection with a supply valve configured to selectively dose the airflow. Optionally, solvent outlet is in fluid connection with a supply valve configured to selectively dose the positive pressure airflow Optionally, the solvent supply is a solvent tank.

Optionally, the air supply is arranged to generate a positive pressure air flow along a positive pressure airflow path at the suction gripper. Optionally, the suction gripper comprises a blow tube and the air supply is arranged to generate a positive pressure air flow in the blow tube.

Optionally, the solvent outlet is positioned along the positive pressure air flow path. Optionally, the suction gripper comprises a blow tube and the air supply is arranged to generate a positive pressure air flow in the blow tube. Optionally, the solvent outlet is mounted on the blow tube.

Optionally, the air supply is arranged to generate a negative pressure air flow along a negative pressure air flow path at the suction gripper. Optionally, the suction gripper comprises a suction tube and the air supply is arranged to generate a negative pressure air flow in the suction tube. Optionally, the solvent outlet is mounted on suction tube.

Optionally, the solvent outlet is positioned along the negative pressure air flow path.

Optionally, the suction gripper comprises a suction cup and the solvent outlet is mounted in the suction cup.

Optionally, the solvent outlet is positioned along an airflow path of at least one air hose connected between the air supply and the suction gripper. Optionally, the solvent outlet is mounted on at least one air hose connected between the air supply and the suction gripper.

Optionally, the suction gripper, the first air hose and/or the second air hose are coated in a non-stick material.

Optionally, the non-stick material is polytetrafluoroethylene.

Optionally, the solvent is water, ethanol, methanol, ammonia, and/or acetone.

Optionally, the solvent comprises one or more additives.

Optionally, the additive is one or more of a disinfectant, a surfactant, a detergent, and/or a dispersant.

Optionally, the moveable manipulator is mounted on a waste sorting robot frame and the solvent tank is mounted above the suction gripper on the waste sorting robot frame.

Optionally, the suction gripper and the air supply are in fluid communication with a dirt container arranged to received dirt and/or water entrained in the airflow at the suction gripper.

Optionally, the waste sorting robot comprises a controller arranged to actuate the valve for selectively dosing the solvent into the airflow path.

Optionally, the controller actuates the valve in dependence on a trigger event.

Optionally, the trigger event is one or more of received weather information, a timer, received sensor information or a manual input.

Optionally, a solvent pump is in fluid communication between the solvent outlet and the solvent supply and the pump is configured to dose the positive pressure airflow.

In another aspect of the disclosure, there is provided a method of controlling a waste sorting robot comprising: moving a manipulator within a working area; controlling a suction gripper connected to the manipulator to selectively grip a waste object in the working area; generating airflow along an airflow path in the suction gripper; and suppling a solvent at a solvent outlet configured to dose the airflow with the solvent.

In yet another aspect of the disclosure, there is provided a method of controlling a waste sorting robot comprising: moving a manipulator within a working area; controlling a suction gripper connected to the manipulator to generate a negative pressure to selectively grip a waste object in the working area; generating positive pressure airflow along an airflow path in the suction gripper; and suppling a solvent at a solvent outlet configured to dose the positive pressure airflow with the solvent.

In a further aspect of the disclosure, there is provided a suction gripper assembly for a waste sorting robot comprising: a suction gripper connected to a manipulator moveable within a working area and arranged to generate a negative pressure to selectively grip a waste object in the working area; an air supply in fluid communication with the suction gripper configured to generate a positive pressure airflow along an airflow path in the suction gripper; and a solvent outlet in fluid communication with a solvent supply wherein the solvent outlet configured to dose the positive pressure airflow with the solvent.

Various other aspects and further examples are also described in the following detailed description and in the attached claims with reference to the accompanying drawings, in which:

Figure 1:
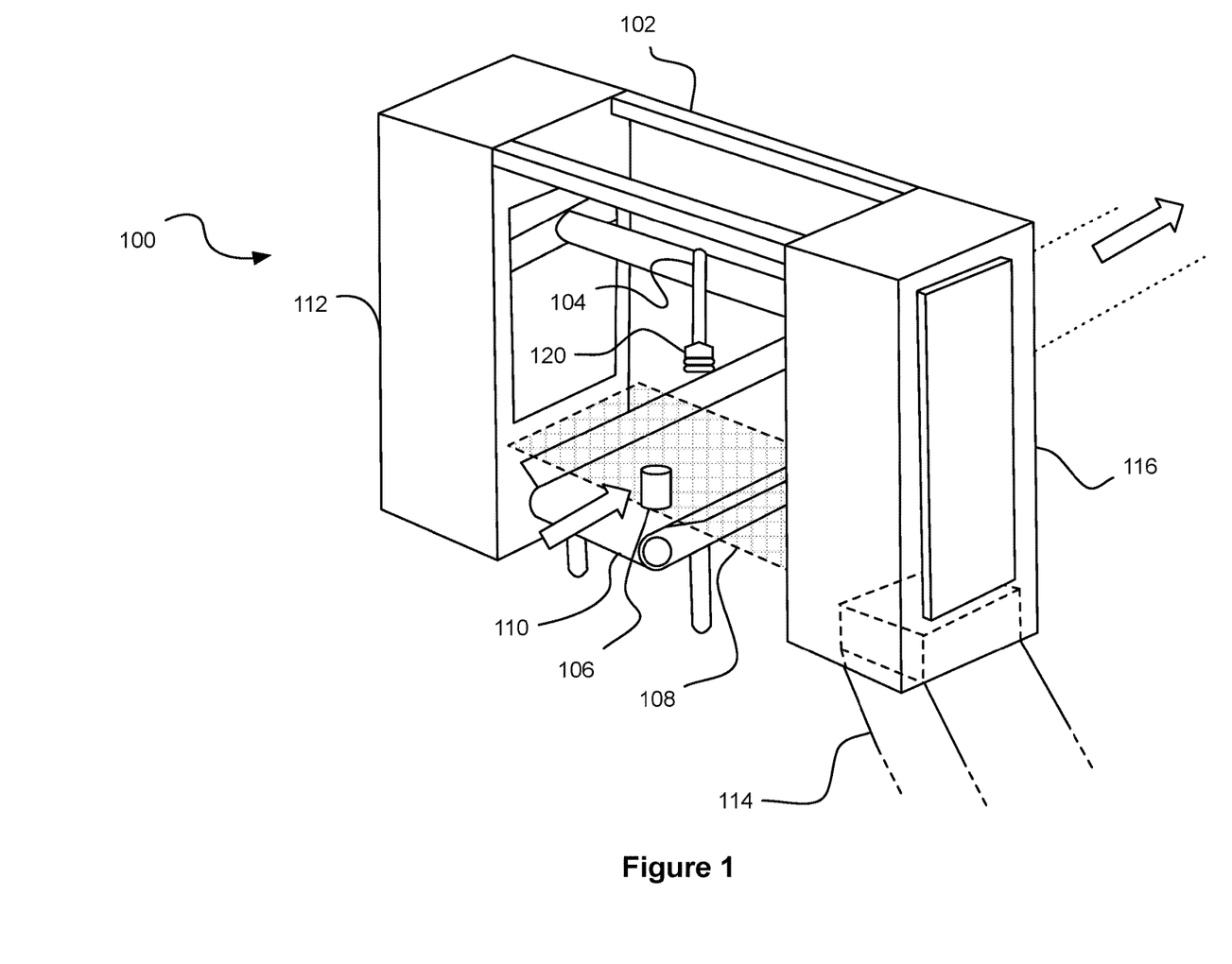
FIG. 1 shows a perspective view of a waste sorting robot.

FIG. 1 shows a perspective view of a waste sorting robot 100. In some examples, the waste sorting robot 100 can be a waste sorting gantry robot 100. In other examples other types of waste sorting robots can be used. For the purposes of brevity, the examples will be described in reference to waste sorting gantry robots but the examples described below can be used with other types of robot such as robot arms or delta robots. In some other examples, the waste sorting robot 100 is a Selective Compliance Assembly Robot Arm (SCARA).

The waste sorting gantry robot 100 comprises a controller 200 (schematically shown in FIG. 2) for sending control and movement instructions to a manipulator 104 for interacting with a waste object 106 to be sorted. For the purposes of clarity, only one waste object 106 is shown in FIG. 1 but there can be any number of waste objects 106 moving past the waste sorting robot 100.

Figure 2:
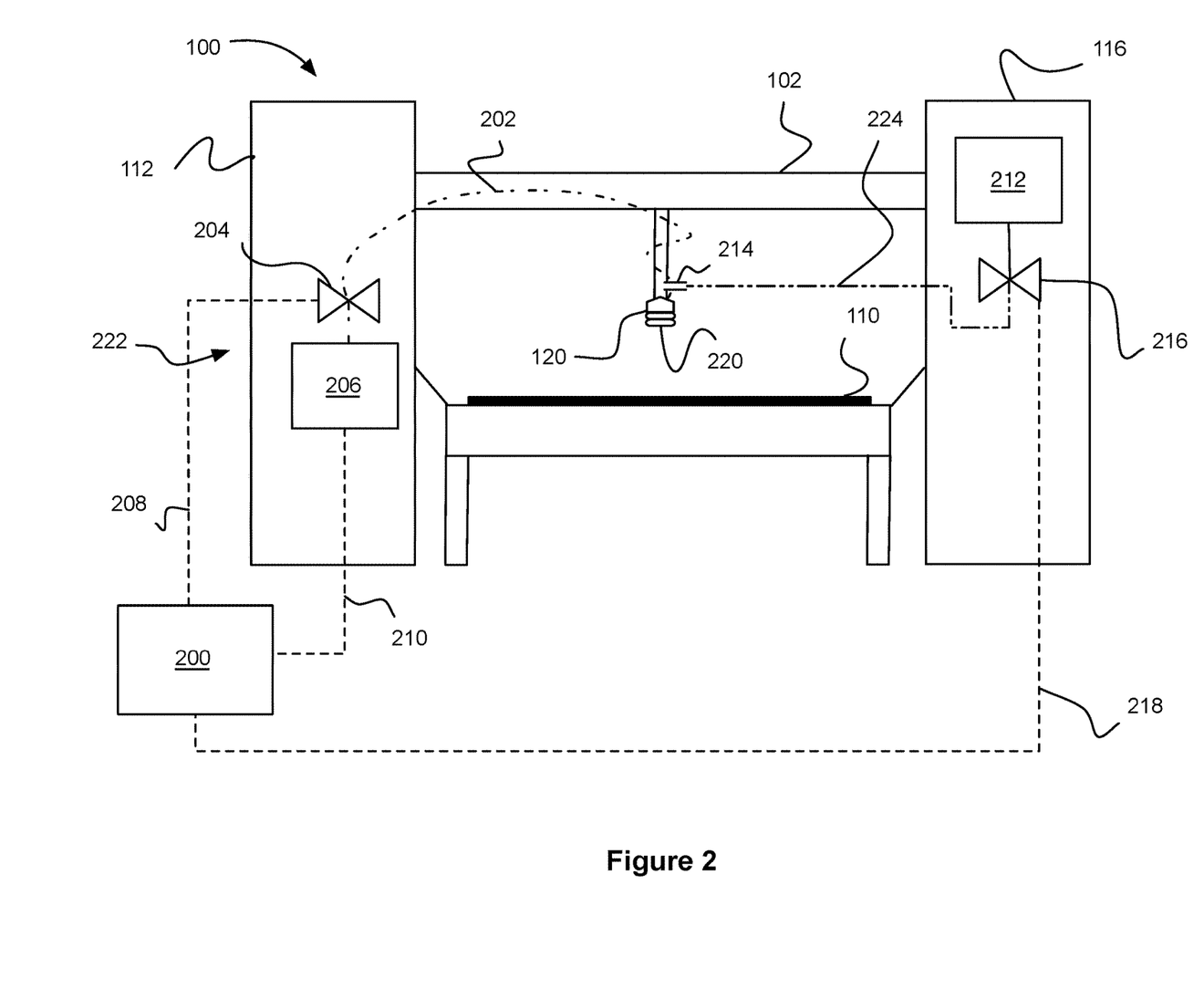
FIG. 2 shows a schematic front view of a waste sorting robot.

The combination of the controller 200 sending control instructions to the manipulator 104 can also be referred to as a "robot". The controller 200 is located remote from the manipulator 104 and in some examples is housed in first and second cabinets 112, 116. In other examples, the controller 200 can be integral with the manipulator 104 and/or a gantry frame 102. In some examples, part of the gantry frame 102 is housed in the first and second cabinets 112, 116 for shielding one or more components of the waste sorting robot 100.

The manipulator 104 physically engages and moves the waste object 106 that enters a working area 108 in order to sort the waste object 106. The working area 108 of a manipulator 104 is an area within which the manipulator 104 is able to reach and interact with the waste object 106. The working area 108 as shown in FIG. 1 is a cross hatched area beneath the manipulator 104.

The manipulator 104 is configured to move at variable heights above the working area 108. In this way, the manipulator 104 is configured to move within a working volume defined by the height above the working area 108 where the robot can manipulate the waste object 106. The manipulator 104 comprises one or more components for effecting relative movement with respect to the waste object 106. The manipulator 104 will now be described in further detail.

As shown in FIG. 1, the manipulator 104 is configured to move within the working volume. The manipulator 104 comprises one or more servos, pneumatic actuators or any other type of mechanical actuator for moving the manipulator 104 in one or more axes. For the purposes of clarity, the servos, pneumatic actuators or mechanical actuators are not shown in FIG. 1.

In some examples, the manipulator 104 is moveable along a plurality of axes. In some examples, the manipulator 104 is moveable along three axes which are substantially at right angles to each other. In this way, the manipulator 104 is movable in an X-axis which is parallel with the longitudinal axis of the conveyor belt 110 ("beltwise"). Additionally, the manipulator 104 is movable across the conveyor belt 110 in a Y-axis which is perpendicular to the longitudinal axis of the conveyor belt 110 ("widthwise"). The manipulator 104 is movable in a Z-axis which is in a direction normal to the working area 108 and the conveyor belt 110 ("heightwise"). Optionally, the manipulator 104 can rotate about one or more axes. In some examples, a suction gripper 120 is coupled to the manipulator 104. Optionally, the suction gripper 120 can rotate about a W-axis. The suction gripper 120 is discussed in further detail below.

The servos, pneumatic actuators or mechanical actuators are connectively connected to the controller 200 and the controller 200 is configured to issue instructions for actuating one or more of the servos, pneumatic actuators or mechanical actuators to move the manipulator 104 within the working area 108. Connections (not shown) between the servos, pneumatic actuators or mechanical actuators and the controller 200 can comprise one or more data and/or power connections. The control of servos, pneumatic actuators or mechanical actuators to move of the manipulator 104 is known and will not be discussed any further.

The waste object 106 is moved into the working area 108 by a conveyor belt 110. The path of travel of the conveyor belt 110 intersects with the working area 108. The direction of the conveyor belt 110 is shown in FIG. 1 by two arrows. This means the waste object 106 moving on the conveyor belt 110 will pass through the working area 108. The conveyor belt 110 can be a continuous belt, or a conveyor belt formed from overlapping portions. The conveyor belt 110 can be a single belt or alternatively a plurality of adjacent moving belts (not shown).

In other examples, the waste object 106 can be conveyed into the working area 108 via other conveying means. The conveyor belt 110 can be any suitable means for moving the waste object 106 into the working area 108. For example, the waste object 106 are fed under gravity via a slide (not shown) to the working area 108.

The waste object 106 can be any type of industrial waste, commercial waste, domestic waste or any other waste which requires sorting and processing. Unsorted waste material comprises a plurality of fractions of different types of waste. Industrial waste can comprise fractions, for example, of metal, wood, plastic, hardcore and one or more other types of waste. In other examples, the waste can comprise any number of different fractions of waste formed from any type or parameter of waste. The fractions can be further subdivided into more refined categories. For example, metal can be separated into steel, iron, aluminium etc. Domestic waste also comprises different fractions of waste such as plastic, paper, cardboard, metal, glass and/or organic waste. A fraction is a category of waste that the waste can be sorted into by the waste sorting gantry robot 100. A fraction can be a standard or homogenous composition of material, such as aluminium, but alternatively a fraction can be a category of waste defined by a customer or user.

The waste sorting robot 100 is arranged to sort the waste object 106 into fractions according to one or more parameters of the waste object 106. The controller 200 receives information from the at least one sensor (not shown) corresponding to the waste object 106 on the conveyor belt 110. The at least one sensor is positioned in front of the manipulator 104 so that detected measurements of the waste object 106 are sent to the controller 200 before the waste object 106 enters the working area 108. In some examples, the at least one sensor can be any sensor suitable for determining a parameter of the waste object 106 e.g. one or more of a RGB camera, an infrared camera, a metal detector, a hall sensor, a temperature sensor, visual and/or infrared spectroscopic detector, 3D imaging sensor, terahertz imaging system, radioactivity sensor and/or a laser e.g. LIDAR.

The controller 200 determines instructions for moving the manipulator 104 based on the received information according to one or more criteria. Various information processing techniques can be adopted by the controller 200 for controlling the manipulator 104. Such information processing techniques are described in WO2012/089928, WO2012/052615, WO2011/161304, WO2008/102052 which are incorporated herein by reference. Techniques for sorting the waste object 106 are known and will not be discussed any further.

Once the waste object 106 has been sorted into a fraction, the waste object 106 can be moved or thrown to a chute 114 adjacent to the conveyor belt 110.

The mix of waste products means that the environment of the waste sorting robot 100 can be particularly dirty. For example the conveyor belt 110 can be dusty and be covered with debris. This means that the waste sorting robot 100 operates in a challenging environment and maintenance must be regularly carried out on parts of the waste sorting robot 100 such as the manipulator 104. Furthermore, often such types of waste objects can comprise organic matter. For example, domestic waste objects can comprise residual waste food. This is often sticky and can adhere to parts of the waste sorting robot 100. Mitigation of the dirt contaminating the waste sorting robot 100 will described in more detail below.

The waste sorting robot 100 will now be described in reference to FIG. 2. FIG. 2 shows a schematic front view of the waste sorting robot 100. The suction gripper 120 comprises a suction cup 220 for physically engaging with a surface of the waste object 106.

The suction gripper 120 is in fluid communication with a pneumatic system 222. The pneumatic system 222 comprises at least a first air hose 202 for connecting the suction gripper 120 to a compressed air supply. For the purposes of clarity, only a first air hose 202 is shown in FIG. 2 connecting the suction gripper 120 to the compressed air supply but there can be any number of air hoses connected between the suction gripper 120 and the compressed air supply. For example, there can optionally be at least a second air hose connecting the suction gripper 120 to the compressed air supply. In this way, a second source of air is provided to the suction gripper 120.

Figure 7:
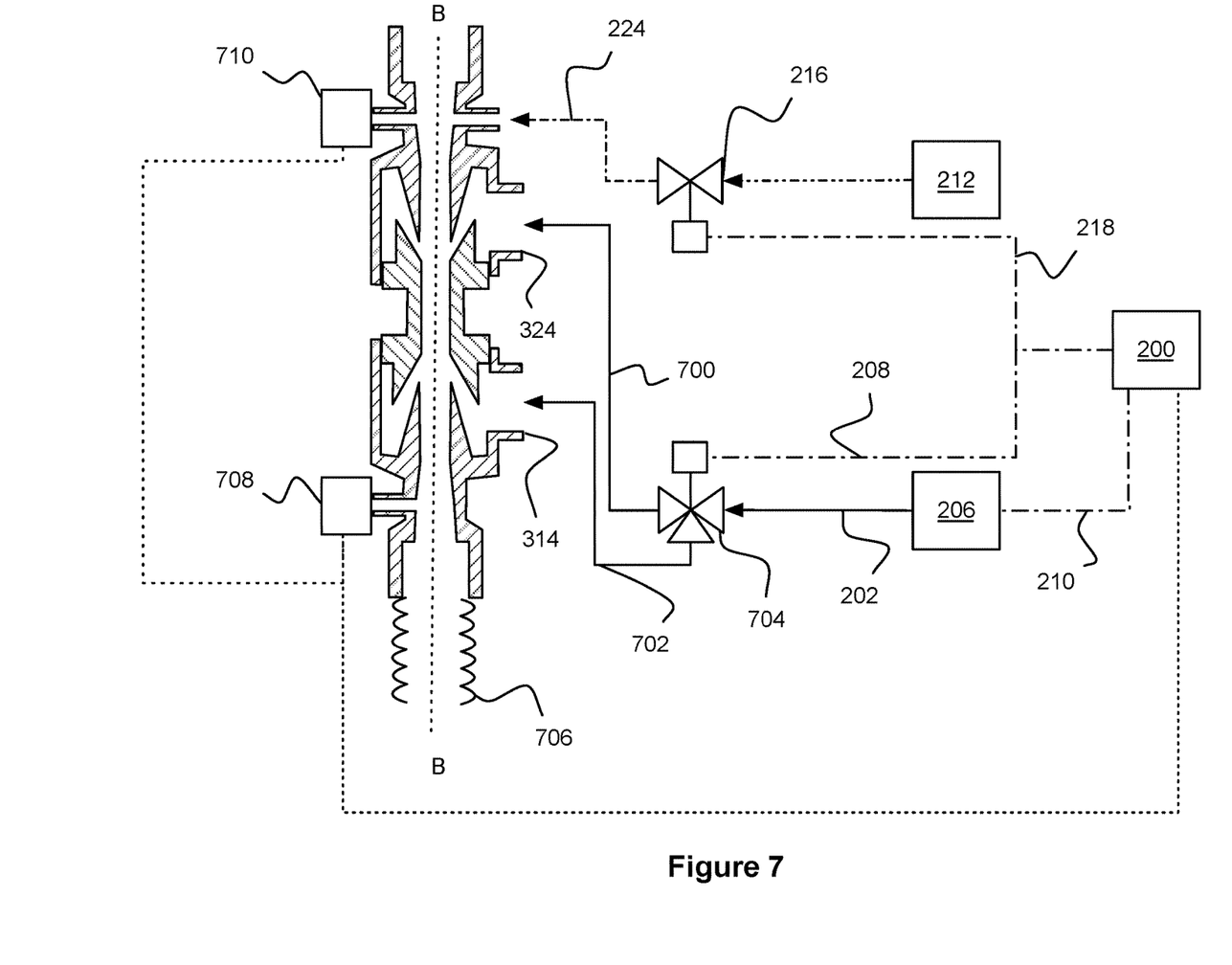
FIG. 7 shows a schematic view of a waste sorting robot.

In some examples, the first air hose 202 can be connected to a plurality of downstream air hoses 700, 702 (as shown in FIG. 7) for supplying compressed air to a plurality of pneumatic components in the pneumatic system 222. For example, the first air hose 202 is a single, unitary air hose mounted on the manipulator 104. By providing only one main air hose 202 which is mounted on the manipulator 104 to the suction gripper 120, installation and maintenance of the waste sorting robot 100 can be simplified. The first air hose 202 is flexible and mounted to the gantry frame 102 and/or the manipulator 104. The first air hose 202 is sufficiently flexible to move and flex so as to change shape as the manipulator 104 moves without impeding the movement of the manipulator 104.

The pneumatic system 222 comprises an air compressor 206 for generating a source of compressed air. Optionally, the pneumatic system 222 can also comprise an air storage tank (not shown) for compressed air. Furthermore, the pneumatic system 222 can also comprise one or more pneumatic valves 204 for selectively providing air to the suction gripper 120. In this way, pneumatic system 222 comprises air supply such as air compressor 206 in fluid connection to the suction gripper 120 configured to generate an airflow along an airflow path between the air supply e.g. the air compressor 206 and the suction gripper 120. In other examples, the air supply can be provided by any suitable source of compressed air or compressed gas.

In some examples, the first air hose 202 is connected to a first downstream supply air hose 700 and a second downstream supply air hose 702. The first air hose 202 is connected to the first downstream supply air hose 700 and a second downstream supply air hose 702 via the pneumatic valve 204. This means the compressed air supplied to either the first downstream supply air hose 700 or the second downstream supply air hose 702 from the first air hose 202. However, different alternative arrangements of hoses and valves can be provided to supply compressed air to the suction gripper 120.

The pneumatic system 222 is schematically shown as being located within the first cabinet 112. However, in other examples the pneumatic system 222 can be partially or wholly located remote from the waste sorting robot 100. For example, there may be a plurality of waste sorting robots 100 on a sorting line (not shown) each of which require a source of air. In this way, a single air compressor 206 can be connected to a plurality of waste sorting robots 100 via a plurality of air hoses 202, 700, 702. Accordingly, the pneumatic system 222 may be located between waste sorting robots 100.

Operation of the pneumatic system 222 is controlled by the controller 200. The controller 200 is connected via pneumatic control lines 208, 210 to the pneumatic system 222, the air compressor 206 and the pneumatic valve 204. The controller 200 is configured to send control instructions to the pneumatic system 222, the air compressor 206, and the pneumatic valve 204. This means that the controller 200 can selectively operate e.g. the air compressor 206 or the pneumatic valve 204 to deliver a supply of air to the suction gripper 120.

The waste sorting robot 100 as shown in FIG. 2 also comprises a solvent supply such as solvent tank 212 for dissolving organic matter or other dirt dried onto the suction gripper 120 or other parts of the pneumatic system 222. In some other examples, the solvent supply is alternatively or additionally a pipe (not shown) in fluid communication with the solvent outlet 214. For example the pipe can be a pipe for feeding solvent e.g. a mains water pipe. This means that the waste sorting robot 100 always connected to a solvent supply and the solvent tank 212 does not have to be replenished. The waste sorting robot 100 can be installed in a remote location and it may not be possible to connect the waste sorting robot 100 to a mains water supply.

In some examples, the solvent is water, but in other examples the solvent can be ethanol, methanol, ammonia, acetone or any other suitable solvent for dissolving organic matter or other dirt dried to the waste sorting robot 100. In a preferred example, the solvent is water because it is easier for the operator to handle water than other solvents. However, there may be certain types of waste objects that contaminate the waste sorting robot 100 with dirt that is not easily removed with water. For example, silicone sealant tubes may contaminate the waste sorting robot 100 with silicone sealant. Silicone sealant may require another solvent other than water for successful removal. The term "solvent" will be used to describe the examples and refer to any suitable fluid for dissolving or removing dirt and debris stuck to the surfaces of the waste sorting robot 100.

In some examples, the solvent can optionally comprise one or more additives. In some examples one or more of a disinfectant, surfactant, detergent, dispersant is added to the solvent to help removal of dirt from the waste sorting robot 100.

The waste sorting robot 100 comprises a solvent outlet 214 which is in fluid connection with the solvent tank 212. The solvent outlet 214 is positioned along the airflow path of the suction gripper 120 and configured to dose the airflow with the solvent. As shown in FIG. 2, the solvent outlet 214 is mounted on the suction gripper 120. In other examples (not shown), the solvent outlet 214 can be mounted on one or more of the first air hose 202, the first downstream supply air hose 700, the second downstream supply air hose 702 and/or the pneumatic valve 204. In this way, the solvent outlet 214 is arranged to dose the airflow remote from the suction gripper 120.

Similar to the pneumatic system 222, the waste sorting robot 100 comprises a solvent hose 224 in fluid communication between the solvent outlet 214 and the solvent tank 212. In some examples, the solvent hose 224 is mounted on the manipulator 104. The solvent hose 224 is flexible and mounted to the gantry frame 102 and/or the manipulator 104. The solvent hose 224 is sufficiently flexible to move and flex so as to change shape as the manipulator 104 moves without impeding the movement of the manipulator 104.

In some examples, the solvent tank 212 can comprise a pump (not shown) for urging the solvent from the solvent tank 212 to the solvent outlet 214. In some examples, the solvent tank 212 can be pressurised and no pump is required. For example, a third air hose (not shown) and another pneumatic valve (not shown) can be coupled to the solvent tank 212 for pressurising the solvent in the solvent tank 212. In this way, the controller 200 can selectively control pressurising the solvent tank 212 to control the flow of the solvent to the solvent outlet 214. Alternatively, the solvent tank 212 is mounted on the gantry frame 102 in a position above the suction gripper 120. This means that the solvent will be fed to the solvent outlet 214 via gravity alone.

In some examples, a dosing pump can be in fluid communication with the solvent tank 212 which enables precise control of the amount of liquid injected. In some examples the dosing pump is a peristatic pump but in other examples other pumps can be used such as diaphragm pumps, piston pumps, nutating pumps, flexible-van pumps, lobed pumps, gear pumps, diffuser pumps or any other suitable means for dosing the solvent. The dosing pump is configured to suck the solvent from the solvent tank 212. The inventors have realized that the dosing pump can be provided without the need for separate valve. Accordingly, the dosing pump can pump the solvent from the solvent tank 212, but the solvent tank 212 will not leak when the dosing pump is not in operation.

In some examples, the solvent tank 212 is mounted in the first cabinet 112 or the second cabinet 116 and easily accessible to an operator. The solvent tank 212 can optionally have a transparent window in a wall of the solvent tank 212 or the wall of the solvent tank 212 can be translucent. This means that the operator can visually inspect the amount of solvent left in the solvent tank 212.

As shown in FIG. 2, there is a solvent valve 216 arranged to selectively control a flow of solvent to the solvent outlet 214. Operation of the solvent dosing is controlled by the controller 200. The controller 200 is connected via solvent control line 218 to the solvent valve 216. The controller 200 is configured to send control instructions to solvent valve 216. This means that the controller 200 can selectively operate the solvent valve 216 to deliver a supply of solvent to the solvent outlet 214 mounted on the suction gripper 120.

Optionally, there is no solvent valve 216 and the solvent is constantly fed to the solvent outlet 214. This is a less preferred example because the solvent is fed to the suction gripper 120 irrespective of other parameters of the environment, waste sorting robot 100 and the waste object 106. However, a constant supply of solvent to the solvent outlet 214 can increase the quality of the seal made between the suction cup 220 and the surface of the waste object 106. In some examples, there is no solvent valve 216 and no solvent pump. In this case, the solvent is constantly fed to the suction gripper 120 e.g. drip fed under gravity.

In some examples, the controller 200 can actuate the solvent valve 216 to modify the flow rate of the solvent to the solvent outlet 214. This means that the controller 200 can adjust the solvent flow rate if the waste sorting robot 100 is particularly dirty. In some examples, the controller 200 can adjust the flow rate of the solvent in dependence on a dirt parameter of the waste sorting robot 100. An operator can manually input information relating to the dirt parameter relating to the cleanliness of the waste sorting robot 100. Additionally or alternatively, the controller 200 can optionally receive and analyse images of the suction cup 220 to determine whether the suction cup 220 is soiled with dried dirt e.g. dried organic matter.

Figure 3:
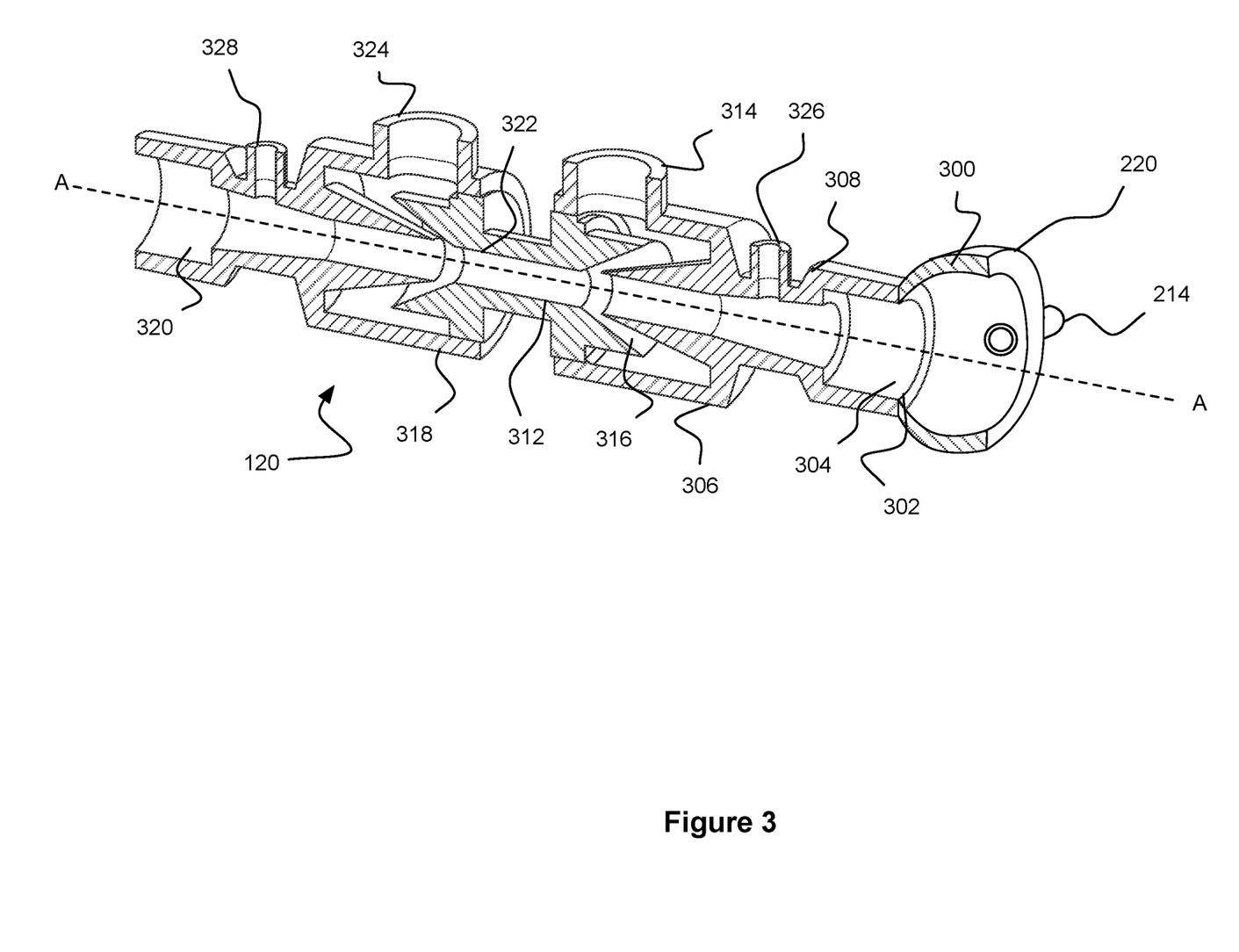
FIG. 3 shows a cross-sectional view of a suction gripper.

An example of the suction gripper 120 will now be discussed in reference to FIG. 3. FIG. 3 shows a cross-sectional side view of the suction gripper 120. As mentioned previously, the suction gripper 120 comprises a suction cup 220. The suction cup 220 as shown in FIG. 3 has a cup shape e.g. an approximate hemispherical shape. However, other known suction cups can be used instead e.g. a ribbed cylindrical suction cup 706 as shown in FIG. 7.

The suction gripper 120 as shown in FIG. 3 comprises an integrated suction tube 306 and blow tube 318 for carrying out grip/pick operations and throwing operations.

A wall 300 of the suction cup 220 comprises an air hole 302 in fluid communication with a suction tube first air inlet 304 of a suction tube 306 for evacuating air from the space within the suction cup 220.

The suction tube 306 comprises an elongate side wall 308. The suction tube 306 comprises the suction tube first air inlet 304 at one end and a suction tube air outlet 312 at another end of the suction tube 306. The suction tube 306 comprises a longitudinal axis A-A. Both the suction tube first air inlet 304 and the suction tube air outlet 312 are aligned with the longitudinal axis A-A of the suction tube 306 as shown in FIG. 3.

The suction air flow through the suction gripper 120 enters from the suction cup 220, through the air hole 302, along the suction tube 306, and exits the suction tube 306 at the suction tube air outlet 312. The negative pressure generated for the suction air flow will now be described. The suction air flow for the suction gripper 120 is generated near the suction cup 220 of the suction gripper 120, which avoids the need for a vacuum hose.

The suction tube 306 comprises a suction tube second air inlet 314 which is in fluid communication with the first air hose 202 (not shown in FIG. 3). Accordingly, the suction tube second air inlet 314 introduces an air source of compressed air into the suction tube 306 between the suction tube first air inlet 304 and the suction tube air outlet 312.

The suction tube second air inlet 314 introduces a fast, high pressure source of air into the suction tube 306. As the air in the suction tube 306 moves towards the air outlet 312, a negative pressure is created in the suction tube 306 via e.g. the venturi effect. A negative pressure is also created in the suction cup 220 since the suction cup 220 is in fluid communication with the suction tube 306. In this way a negative pressure airflow is created along a negative pressure airflow path. The negative pressure airflow path is along the longitudinal axis A-A. Alternatively, a separate vacuum hose (not shown) in fluid communication with a vacuum source such as a vacuum pump is coupled to the suction gripper 120 at the suction cup 220 or the suction tube 306 to generate a negative pressure for gripping objects to be sorted. Accordingly, in some examples, the suction tube 306 is optional.

The suction tube second air inlet 314 comprises an annular cone shaped nozzle 316 which is coaxial with the suction tube 306. The annular nozzle 316 is in fluid communication with the second downstream supply air hose 702 as shown in FIG. 7.

The suction gripper 120 also comprises a blow or "sneezing" tube 318 connected to the suction tube 306. The blow tube 318 is essentially the same as the suction tube 306 but reversed in orientation to generate a positive air pressure rather than a negative air pressure. The blow tube 318 comprises the same features as the suction tube 306. The blow tube 318 comprises an elongate side wall 308 which is substantially cylindrical. The blow tube 318 comprises a blow tube first air inlet 320 at one end and a blow tube air outlet 322 at another end. The blow tube air outlet 322 is coupled to and in fluid communication with the suction tube air outlet 312.

Similarly to the suction tube 306, the blow tube 318 comprises a blow tube second air inlet 324 which is in fluid communication with the first downstream supply air hose 700. Accordingly, the blow tube second air inlet 324 introduces a second air supply into the suction gripper 120. The second air supply is provided to the blow tube 318 between the blow tube first air inlet 320 and the blow tube air outlet 322. The blow tube second air inlet 324 is an annular nozzle similar to that described above for the suction tube 306. In this way a positive pressure airflow is created along a positive pressure airflow path. The positive pressure airflow path is along the longitudinal axis A-A. In some examples, the blow tube 318 is optional and a positive pressure is provided by an air hose in fluid communication with an air supply.

The second downstream supply air hose 702 is coupled to the suction tube second air inlet 314. The blow tube second air inlet 324 is coupled to the first downstream supply air hose 700.

In some examples the first air hose 202 is coupled between the air compressor 206 and a pneumatic valve 204. In some examples the pneumatic valve 204 which is a three-way valve 704. The three-way valve 704 is coupled to the first air hose 202, the first downstream supply air hose 700, and the second downstream supply air hose 702. The three-way valve 704 is configured for selectively providing an air flow to either the suction tube 306 or the blow tube 318. In some examples the three-way valve 704 can be replaced with two separate valves (not shown). This means that the suction gripper 120 can selectively be operated in a first mode whereby a negative pressure is provided at the suction cup 220 or a second mode whereby a positive pressure is provided at the suction cup 220.

In some examples, the suction tube 306 comprises a first opening 326 to receive a first pressure sensor 708 (as shown in FIG. 7). Likewise, the blow tube 318 comprises a second opening 328 to receive a second pressure sensor 710 (as shown in FIG. 7). The first and second pressure sensors 708, 710 are connected to the controller 200.

The suction gripper 120 as shown in FIG. 3 comprises a solvent outlet 214 mounted in the suction cup 220. For the purposes of clarity, the solvent hose 224 is not shown in FIG. 3. This means that the solvent outlet 214 can dose the airflow as close as possible to the surface of the waste object 106. This means that the solvent can help improve the seal during a picking operation.

Figure 4A:
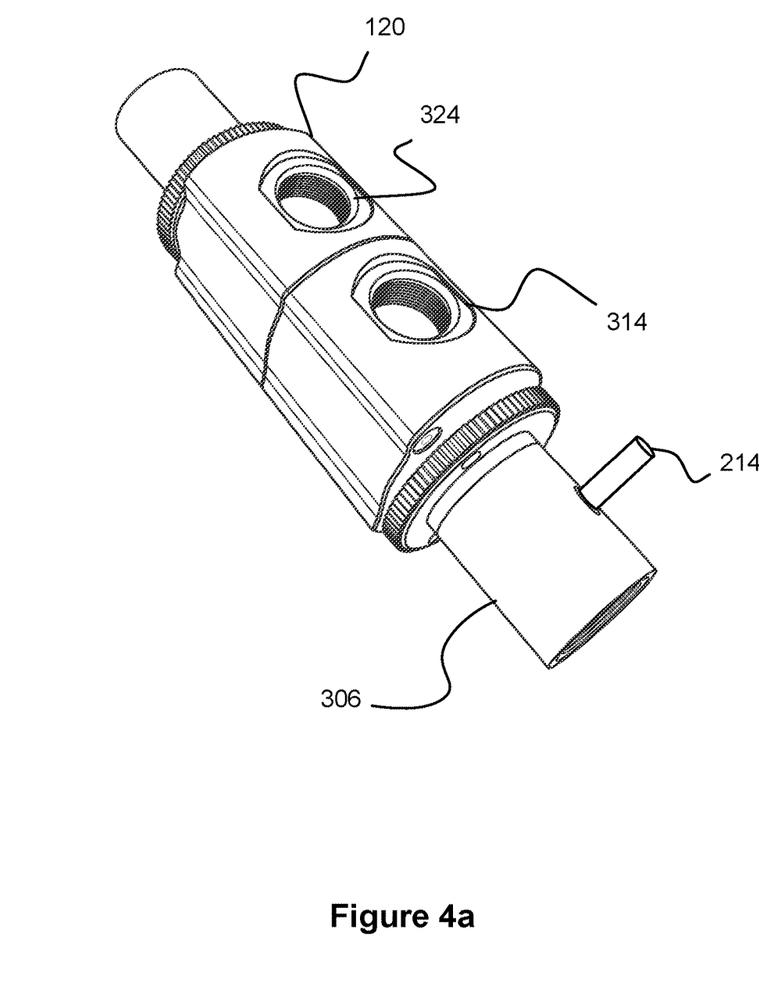
FIGS. 4a and 4b show a perspective view of a suction gripper.
Figure 4B:
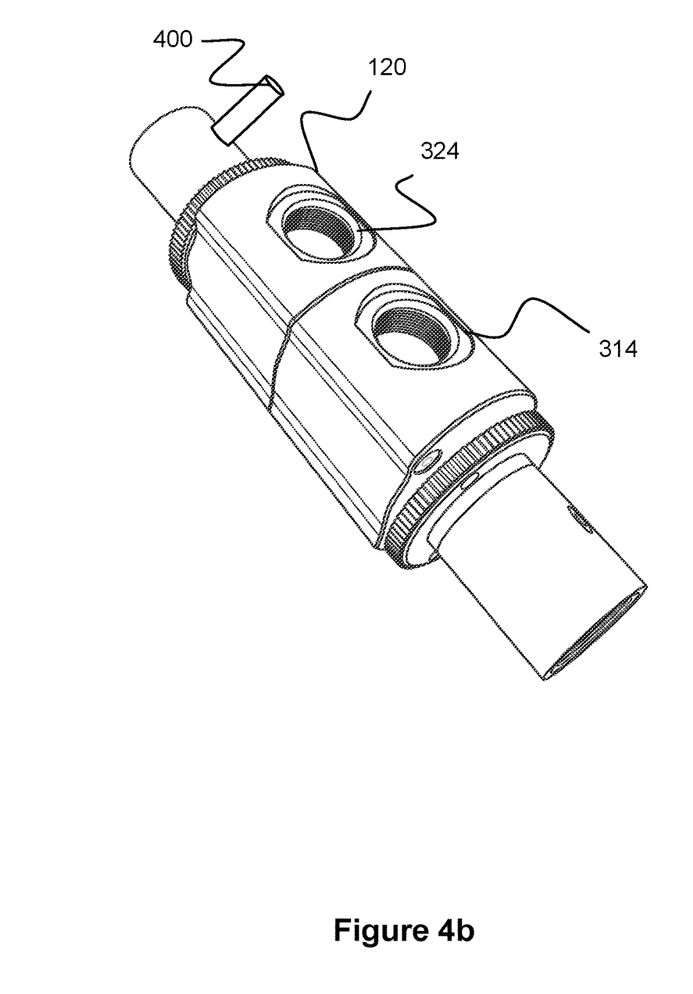

FIGS. 4a and 4b show a perspective view of the suction gripper 120. The suction cup 220 has not been shown in FIG. 4a or 4b. The internal surfaces 400, 402 of the suction tube second air inlet 314 and the blow tube second air inlet 324 comprise screw threads for respectively receiving the second downstream supply air hose 702 and the first downstream supply air hose 700. Similarly, the internal surface (not shown in FIG. 4) of the solvent outlet 214 can optionally comprise a screw thread for attaching the solvent hose 224 to the solvent outlet 214. The solvent outlet 214 as shown in FIG. 4a is in fluid communication with the suction tube 306. Accordingly, the solvent outlet 214 is not attached to the suction cup 220 as shown in FIG. 3. However, optionally the suction gripper 120 as shown in FIG. 4a can be used with the suction cup 220 as shown in FIG. 3 where the solvent outlet 214 is connected to the suction cup 220.

FIG. 4b is identical to the arrangement as shown in FIG. 4a except that the solvent outlet 400 is in fluid communication with the blow tube 318.

Figure 5:
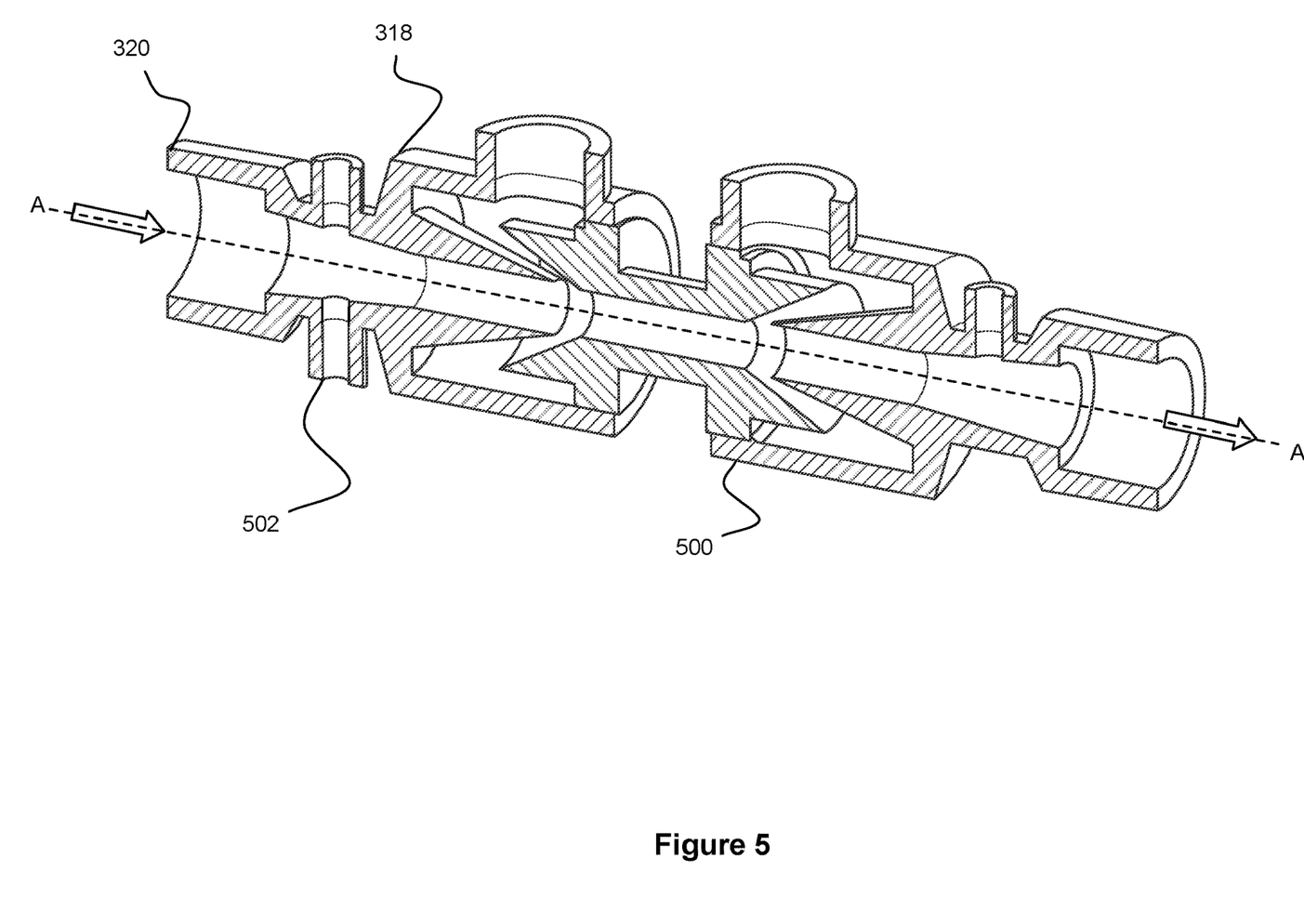
FIG. 5 shows a cross-sectional view of a suction gripper.

Turning to FIG. 5, another example will now be described. FIG. 5 shows a cross-sectional view of a suction gripper 500 without a suction cup 220. The suction gripper 500 is the same as the suction gripper 500 as shown in FIG. 3 except that a solvent outlet 502 is mounted on the blow tube 318. This is similar to the arrangement as shown in FIG. 4b.

The solvent hose 224 is attached to the solvent outlet 502 in the same way as described in reference to FIG. 3. The position of the solvent outlet 502 with respect to the blow tube 318 means that the solvent outlet 502 introduces the solvent into the positive pressure airflow path. Accordingly, the solvent is entrained in the airflow (as indicated by the arrows) in the blow tube 318 and the solvent is blown out of the suction gripper 120 and the suction cup (not shown). A short blast of air (or "sneeze") through the suction gripper 120, in some examples, turns the solvent into a mist. This evenly coats the inside of the suction gripper 120 as the positive pressure airflow exits the suction gripper 120. In the parts of the suction gripper 120 with a larger diameter e.g. the suction cup 220, the airflow is slower and the organic matter may get stuck. By blowing the solvent over the inside of the suction cup 220, the contamination is prevented. Furthermore, existing contamination of organic matter on the suction gripper may actively be removed by dosing the positive pressure airflow with the solvent. Since the solvent is introduced in the blow tube 318 part of the suction gripper 120, the solvent is not sucked into the pneumatic system 222. Even if the suction tube 306 is operational, the solvent will be ejected from the blow tube 318 at the blow tube first air inlet 320.

Whilst FIG. 5 shows the solvent outlet 502 is positioned opposite the second opening 328 for receiving the second pressure sensor 710, the solvent outlet 502 can be positioned at any position along the positive pressure airflow path (aligned along axis A-A).

Figure 6:
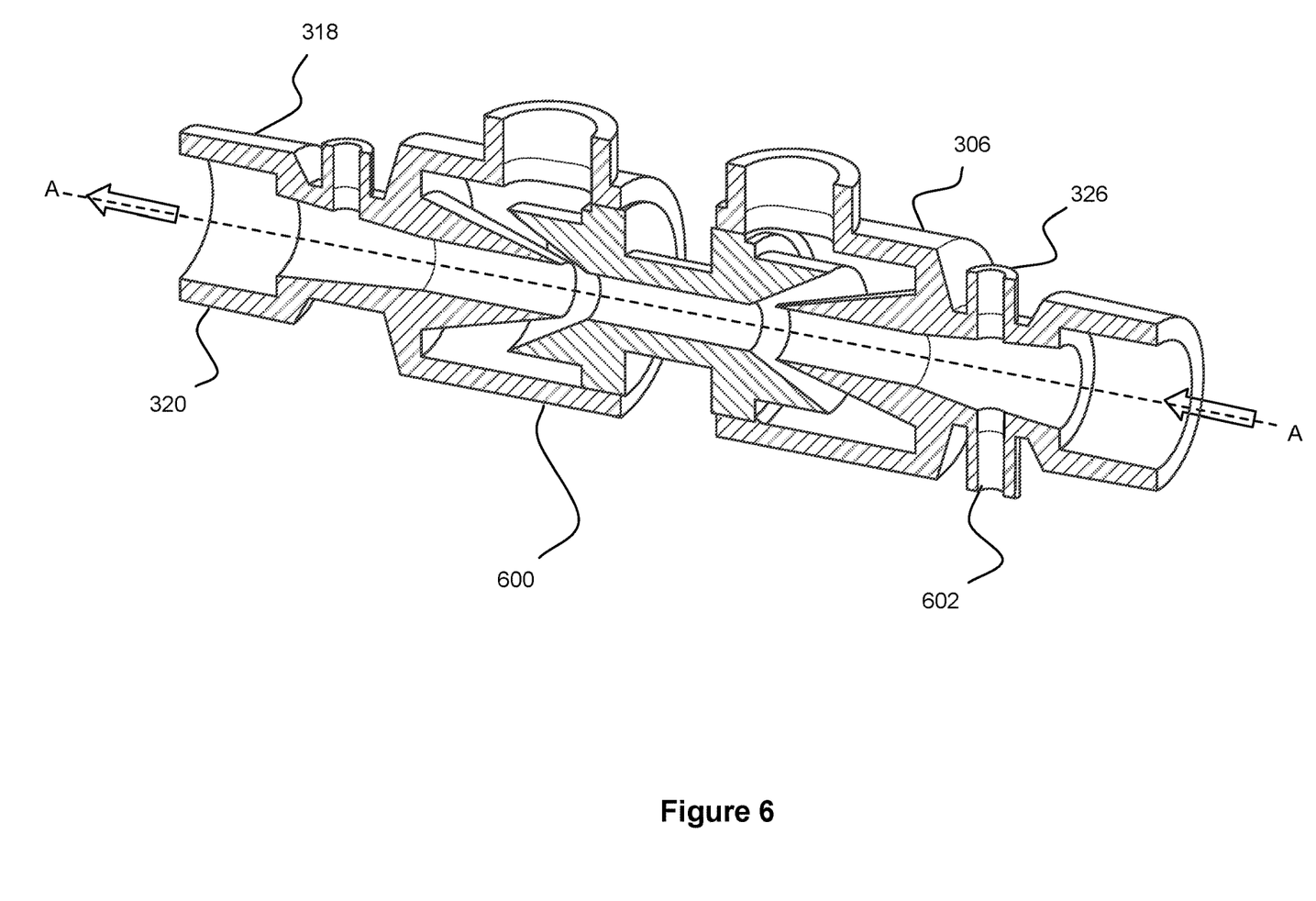
FIG. 6 shows a cross-sectional view of a suction gripper.

Turning to FIG. 6, another example will now be described. FIG. 6 shows a cross-sectional view of a suction gripper 600 without a suction cup 220. The suction gripper 600 is the same as the suction gripper 600 as shown in FIG. 3 except that a solvent outlet 602 is mounted on the suction tube 306 instead of the suction cup 220.

The solvent hose 224 is attached to the solvent outlet 602 in the same way as described in reference to FIG. 5. The position of the solvent outlet 602 with respect to the suction tube 306 means that the solvent outlet 602 introduces the solvent into the negative pressure airflow path. Accordingly, the solvent is entrained in the airflow (as indicated by the arrows) in the suction tube 306 and the solvent is drawn into the suction gripper 120 and the suction cup (not shown). Since the solvent is introduced in the suction tube 306 part of the suction gripper 120, the solvent is sucked towards the pneumatic system 222. When the suction tube 306 is operational, the solvent will mostly be ejected from the blow tube 318 at the blow tube first air inlet 320.

Whilst FIG. 6 shows the solvent outlet 602 is positioned opposite the first opening 326 for receiving the first pressure sensor 708, the solvent outlet 602 can be positioned at any position along the negative pressure airflow path (aligned along axis A-A).

In some examples, the suction gripper 120 and the air supply are optionally in fluid communication with a dirt container (not shown). The dirt container is arranged to receive dirt and/or water entrained in the airflow at the suction gripper 120.

In some other examples, the suction gripper 120 comprises a plurality of solvent outlets so that different parts of the suction gripper 120 and/or the pneumatic system 222 can be dosed with the solvent. In other examples, the suction gripper 120 comprises a first solvent outlet 214 in the suction cup 220, a second solvent outlet 502 in the blow tube 318. In other words, the examples as shown in FIGS. 3 and 5 can be combined.

In some other examples, the solvent outlet 214, 502, 602 optionally comprises a nozzle (not shown). The nozzle is a narrow opening and causes the solvent to be sprayed into the airflow in the suction gripper 120 in a fine mist. This can help propagate the solvent through the suction gripper 120 can ensure that any caked on dirt and debris is exposed to the solvent spray droplets.

In some examples, one or more of the suction gripper 120, the suction cup 220, the first air hose 202 is connected to a first downstream supply air hose 700 and a second downstream supply air hose 702, the pneumatic valves 204, 204 are coated in a non-stick material. In some examples, the non-stick coating is polytetrafluoroethylene (PTFE) chlorotrifluoroethylene, polychlorotrifluoroethylene, Kel-F, Voltalef, Perfluoroalkoxy, or tetrafluorethylene-perfluoropropylene. This means that the dirt and debris are less likely to build up on the pneumatic system 222 or any of the components thereof.

Figure 8:
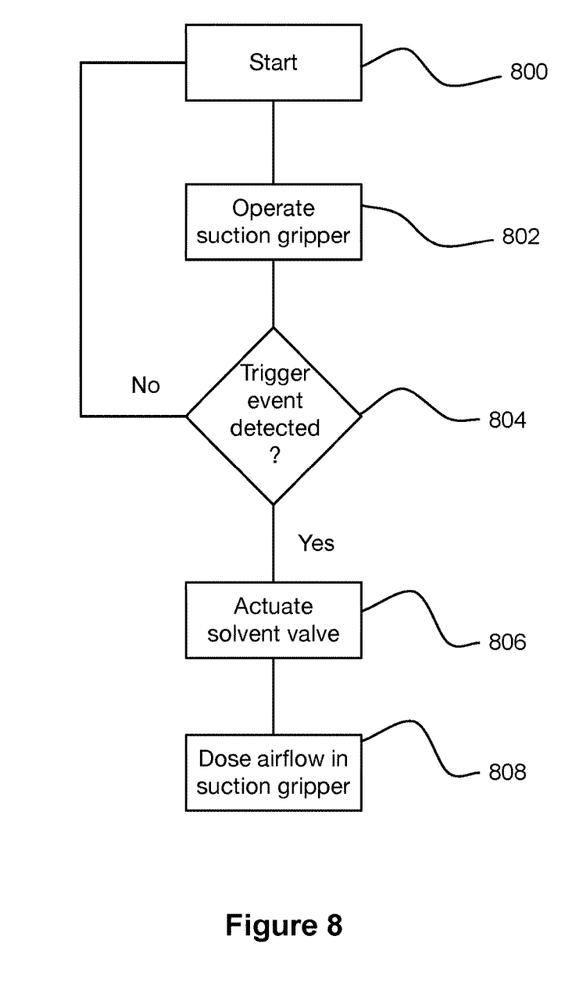
FIG. 8 shows a flow diagram view of a method used by a waste sorting robot.

Reference will now be made to FIG. 8. FIG. 8 shows a flow diagram view of a method used by the waste sorting robot 100. The controller 200 determines that the manipulator 104 should carry out a pick operation and the method for dosing the suction gripper 120 starts as show in step 800. The controller 200 then sends control instructions to the manipulator 104 and the suction gripper 120 to carry out the pick operation in step 802.

During or after the pick operation, the controller 200 determines whether the trigger for dosing the suction gripper 120 has been detected as shown in step 804. In some other examples, the controller 200 determines whether the trigger for dosing the suction gripper 120 has been detected as shown in step 804 before the suction gripper 120 is operated.

In some examples, the operator manually indicates to the controller 200 that the suction gripper 120 should be dosed with the solvent. The operator can send an instruction to the controller 200 by pushing a button on the waste sorting robot 100 or inputting information at a user terminal. For example, the operator can instruct the controller 200 to carry out a solvent dosing operation during a maintenance procedure.

In some other examples, the controller 200 determines that a timer has expired after a predetermined period of time. For example, the controller 200 has determined that 1 hour has passed since the last solvent dosing operation. In other examples, the timer can be for any period of time e.g. 1 minute, 10 minutes, 30 minutes, 4 hours, 8 hours, 12 hours, 24 hours.

In some other examples, the waste sorting robot 100 comprises a moisture sensor (not shown) on the conveyor belt 110. The moisture sensor can detect whether the waste objects 106 are wet and leaving moisture on the conveyor belt 110. If the controller 200 determines that the conveyor belt 110 has been dry for more than a predetermined period of time, then the controller 200 initiates the solvent dosing operation.

In some other examples, the controller 200 receives environmental data, for example weather data. The controller 200 determines whether there is rain forecast within a predetermined period of time when the waste sorting robot 100 is in operation. For example, if the controller 200 determines that rain is not forecast in the location of the waste sorting robot 100 for more than 3 days, the controller 200 initiates the solvent dosing operation.

In some examples, one or more of the triggers can be used by the controller 200 to determine whether to initiate the solvent dosing operation. In some other examples, any suitable information can be used by the controller 200 to determine whether to initiate the solvent dosing operation.

When the controller 200 initiates the solvent dosing operation, the controller 200 sends a control instruction to actuate the solvent valve 216 according to step 806. The solvent outlet 214 then does the airflow in the suction gripper 120 with the solvent according to step 808.

Whilst the controller 200 initiates the solvent dosing operation, the controller 200 can modify the flow rate of the solvent at the solvent outlet 214 and modify the duration of the solvent dosing operation. The controller 200 can modify the solvent dosing operation in dependence of one of more parameters of the waste sorting robot 100.

By periodically introducing solvent into the airflow of the suction gripper 120, the build-up of dirt and debris can be reduced. This means that the waste sorting robot 100 requires less maintenance and is more efficient.

In another example two or more examples are combined. Features of one example can be combined with features of other examples.

Examples of the present invention have been discussed with particular reference to the examples illustrated. However it will be appreciated that variations and modifications may be made to the examples described within the scope of the invention.

The invention claimed is:

1. A waste sorting robot comprising:
   a manipulator moveable within a working area;
   a suction gripper connected to the manipulator and arranged to generate a negative pressure to selectively grip a waste object in the working area;
   an air supply in fluid communication with the suction gripper configured to generate a positive pressure airflow along an airflow path in the suction gripper; and
   a solvent outlet in fluid communication with a supply of a solvent wherein the solvent outlet is configured to dose the positive pressure airflow with the solvent.

2. The waste sorting robot according to claim 1 wherein the solvent outlet is mounted on the suction gripper along the airflow path.

3. The waste sorting robot according to claim 1 wherein solvent outlet is in fluid connection with a supply valve configured to selectively dose the positive pressure airflow.

4. The waste sorting robot according to claim 3 wherein the waste sorting robot comprises a controller arranged to actuate the supply valve for selectively dosing the solvent into the airflow path.

5. The waste sorting robot according to claim 4 wherein the controller actuates the supply valve based on a trigger event, wherein the trigger event is one or more of received weather information, a timer, received sensor information or a manual input.

6. The waste sorting robot according to claim 1 wherein the supply of the solvent is a solvent tank.

7. The waste sorting robot according to claim 6 wherein the manipulator is mounted on a waste sorting robot frame and the solvent tank is mounted above the suction gripper on the waste sorting robot frame.

8. The waste sorting robot according to claim 1 wherein the suction gripper comprises a blow tube and the air supply is arranged to generate a positive pressure air flow in the blow tube.

9. The waste sorting robot according to claim 8 wherein the solvent outlet is mounted on the blow tube.

10. The waste sorting robot according to claim 1 wherein the suction gripper comprises a suction tube and the air supply is arranged to generate a negative pressure air flow in the suction tube.

11. The waste sorting robot according to claim 10 wherein the solvent outlet is mounted on the suction tube.

12. The waste sorting robot according to claim 1 wherein the suction gripper comprises a suction cup and the solvent outlet is mounted in the suction cup.

13. The waste sorting robot according to claim 1 wherein the solvent outlet is mounted on at least one air hose connected between the air supply and the suction gripper, wherein the at least one air hose comprises a first air hose and a second air hose, and wherein the suction gripper, the first air hose and/or the second air hose are coated in a non-stick material.

14. The waste sorting robot according to claim 13 wherein the non-stick material is polytetrafluoroethylene.

15. The waste sorting robot according to claim 1 wherein solvent is water, ethanol, methanol, ammonia, and/or acetone.

16. The waste sorting robot according to claim 1 wherein the solvent comprises one or more of a disinfectant, a surfactant, a detergent, and/or a dispersant.

17. The waste sorting robot according to claim 1 wherein the suction gripper and the air supply are in fluid communication with a dirt container arranged to receive dirt and/or water entrained in the airflow path at the suction gripper.

18. The waste sorting robot according to claim 1 wherein a solvent pump is in fluid communication between the solvent outlet and the supply of the solvent and the solvent pump is configured to dose the positive pressure airflow.

19. A method of controlling a waste sorting robot comprising:
   moving a manipulator within a working area;
   controlling a suction gripper connected to the manipulator to generate a negative pressure to selectively grip a waste object in the working area;
   generating a positive pressure airflow along an airflow path in the suction gripper; and
   supplying a solvent at a solvent outlet configured to dose the positive pressure airflow with the solvent.

20. A suction gripper assembly for a waste sorting robot comprising:
   a suction gripper connected to a manipulator moveable within a working area and arranged to generate a negative pressure to selectively grip a waste object in the working area;
   an air supply in fluid communication with the suction gripper configured to generate a positive pressure airflow along an airflow path in the suction gripper; and
   a solvent outlet in fluid communication with a supply of a solvent wherein the solvent outlet is configured to dose the positive pressure airflow with the solvent.

* * * * *